(12) United States Patent
Pappalardo et al.

(10) Patent No.: US 8,078,804 B2
(45) Date of Patent: Dec. 13, 2011

(54) METHOD AND ARRANGEMENT FOR CACHE MEMORY MANAGEMENT, RELATED PROCESSOR ARCHITECTURE

(75) Inventors: Francesco Pappalardo, Paternò (IT); Giuseppe Notarangelo, Gravina di Catania (IT); Elena Salurso, Mascalucia (IT); Elio Guidetti, Como (IT)

(73) Assignees: STMicroelectronics S.r.l., Agrate Brianza (MI) (IT); STMicroelectronics N.V., Amsterdam (NL)

(*) Notice: Subject to any disclaimer, the term of this patent is extended or adjusted under 35 U.S.C. 154(b) by 452 days.

(21) Appl. No.: 11/768,462

(22) Filed: Jun. 26, 2007

(65) Prior Publication Data
US 2008/0016317 A1    Jan. 17, 2008

(30) Foreign Application Priority Data
Jun. 28, 2006  (EP) .................................. 06116248

(51) Int. Cl.
| | |
|---|---|
| G06F 12/00 | (2006.01) |
| G06F 13/00 | (2006.01) |
| G06F 13/28 | (2006.01) |
| G06F 15/00 | (2006.01) |
| G06F 15/76 | (2006.01) |
| G06F 9/30  | (2006.01) |
| G06F 9/40  | (2006.01) |

(52) U.S. Cl. ........ 711/130; 711/118; 711/128; 711/129; 711/133; 711/E12.038; 712/3; 712/16; 712/203

(58) Field of Classification Search .................. 711/118, 711/128, 129, 130, 133, 153, E12.038; 712/3, 712/16, 203
See application file for complete search history.

(56) References Cited

U.S. PATENT DOCUMENTS

| | | | | |
|---|---|---|---|---|
| 4,888,679 | A  * | 12/1989 | Fossum et al. | 712/6 |
| 5,418,973 | A  * | 5/1995  | Ellis et al. | 712/3 |
| 5,822,606 | A  * | 10/1998 | Morton | 712/16 |
| 6,496,902 | B1 * | 12/2002 | Faanes et al. | 711/118 |
| 6,591,345 | B1 * | 7/2003  | Seznec | 711/127 |
| 6,665,774 | B2 * | 12/2003 | Faanes et al. | 711/118 |
| 2002/0144061 | A1 * | 10/2002 | Faanes et al. | 711/126 |
| 2005/0283587 | A1 | 12/2005 | Pappalardo et al. | 712/22 |

OTHER PUBLICATIONS

Barretta et al., SIMD Extension to VLIW Multicluster Processors for Embedded Applications, Proceedings 2002 IEEE International Conference on Computer Design: VLSI in Computers and Processors, Sep. 16, 2002, pp. 523-526.

* cited by examiner

*Primary Examiner* — Michael Alsip
(74) *Attorney, Agent, or Firm* — Lisa K. Jorgenson; Allen, Dyer, Doppelt, Milbrath & Gilchrist, P.A.

(57) ABSTRACT

A data cache memory coupled to a processor including processor clusters are adapted to operate simultaneously on scalar and vectorial data by providing data locations in the data cache memory for storing data for processing. The data locations are accessed either in a scalar mode or in a vectorial mode. This is done by explicitly mapping the data locations that are scalar and the data locations that are vectorial.

12 Claims, 4 Drawing Sheets

SCALAR MEMORY

VECTORIAL MEMORY

METHOD AND ARRANGEMENT FOR CACHE MEMORY MANAGEMENT, RELATED PROCESSOR ARCHITECTURE

FIELD OF THE INVENTION

The invention relates to cache memory management in processor architectures, and in particular, to cache memory management in microprocessors directed to multimedia applications. Reference to this field of use is not to be construed as limiting the scope of the invention

BACKGROUND OF THE INVENTION

There is an increasing demand for microprocessor architectures adapted to meet the requirements of various multimedia processing tasks and algorithms. The quest for increasing performance levels, however, needs to cope with the need of limiting power consumption and code size growth.

Vectorial and/or SIMD (Single Instruction, Multiple Data) architectures are thus used in applications with massive data parallelism, while VLIW (Very Long Instruction Word) architectures are optimal for applications with high instruction parallelism.

The multi-dimensional microprocessor described in U.S. published patent application no. 2005/0283587 is exemplary of a microprocessor with SIMD/vectorial capabilities based on a VLIW machine. As mentioned in this description, an example of architecture for digital media processing was introduced by Intel with their MXP5800/MXP5400 processor architecture. A multi-dimensional microprocessor architecture improves significantly over this more conventional architecture. For instance, in the MXP5800/MXP5400 architecture, processors require an external PC-based host processor for downloading microcode, register configuration, register initialization, and interrupt servicing. Conversely, in a multi-dimensional microprocessor architecture this task is allotted to one computational unit for each column.

Moreover, if compared against the case of a multi-dimensional microprocessor, the basic computational block in the MXP5800/MXP5400 processors is inevitably more complex. It includes five programming elements and each of these has its own registers and its own instruction memory. This entails a significant area size and large power consumption, particularly because a power management unit is not used to power down inactive Processing Elements (PEs).

One of the key problems to address in these architectures to take advantage of data parallelism is to properly handle access to the data. Optimizing access turns out to be a difficult task in that a processor having a high computational power requires access to the data cache to be optimized. Generally, this problem is addressed by resorting to two different approaches, namely a single data cache shared by all clusters (i.e., a Shared Memory or SM) with an address space which is similarly shared; and equipping each cluster with a dedicated cache (i.e., a Distributed Memory or DM).

If the choice is made to equip each individual cluster with a cache of its own (DM) by correspondingly allowing each cluster to address the data locally, access efficiency to the data is maximized. Each cluster will access the data in its cache without interfering with any other accesses. Compilation of the computational section is, at least notionally, simplified while rendering it more complex for the programmer to control the program flow and generating problems in terms of cache coherence. For this reason a much more complex memory architecture may be required at a higher level. The program flow of instructions is only one single if a cluster accesses certain data, with all the other clusters doing the same.

Moreover, the DM approach is not an optimum one from the viewpoint of properly exploiting the cache memory. The clusters will not all be simultaneously active, and in those parts of the program where, e.g., a single cluster is active, a major portion of the memory will be unavailable. Another disadvantage is that the presence of separate caches makes it necessary to duplicate a large amount of data (constants, tables, etc.). The main processor may need to write or read data in the memory space reserved to other clusters. Additionally, an ad hoc data exchange mechanism will be required for initialization purposes or communication between the clusters.

Additionally, one needs to take into account that further, non-negligible traffic and a fairly complex cache architecture will be required to ensure the coherence of the data in a plurality of caches. Conversely, if a single centralized cache is adopted (SM), each cluster needs to be able to access its data via a single data path, which will inevitably become a system bottleneck. Moreover, while enabling the programmer to see the data accessed by each individual cluster, thus permitting a better control of the program flow, the presence of a single address space necessitates explicit access to each single data item.

SUMMARY OF THE INVENTION

In view of the foregoing background, an object of the invention is to provide a cache memory management technique that overcomes the shortcomings and drawbacks outlined above.

This and other objects, advantages and features in accordance with the invention are provided by a method for managing a data cache memory associated with a processor comprising a plurality of processor clusters that operate simultaneously on scalar and vectorial data. The method comprises providing in the data cache memory data locations for storing therein data for processing by the plurality of processor clusters, and accessing the data locations in the data cache memory either in a scalar mode or in a vectorial mode. The method may further comprising explicitly mapping the data locations of the cache memory that are scalar and the data locations of the cache memory that are vectorial.

Another aspect of the invention is directed to a processor comprising a data cache memory for storing data for processing, with data locations therein being accessible either in a scalar mode or in a vectorial mode, A plurality of processor clusters may be coupled to the data cache memory for operating simultaneously on scalar and vectorial data, and for accessing the data locations either in the scalar mode or in the vectorial mode. The processor may further comprise at least one control register for explicitly mapping the data locations in the data cache memory that are scalar and the data locations that are vectorial.

BRIEF DESCRIPTION OF THE DRAWINGS

The invention will now be described, by way of example only, with reference to the enclosed representations, wherein.

DETAILED DESCRIPTION OF THE PREFERRED EMBODIMENTS

Figure 3:
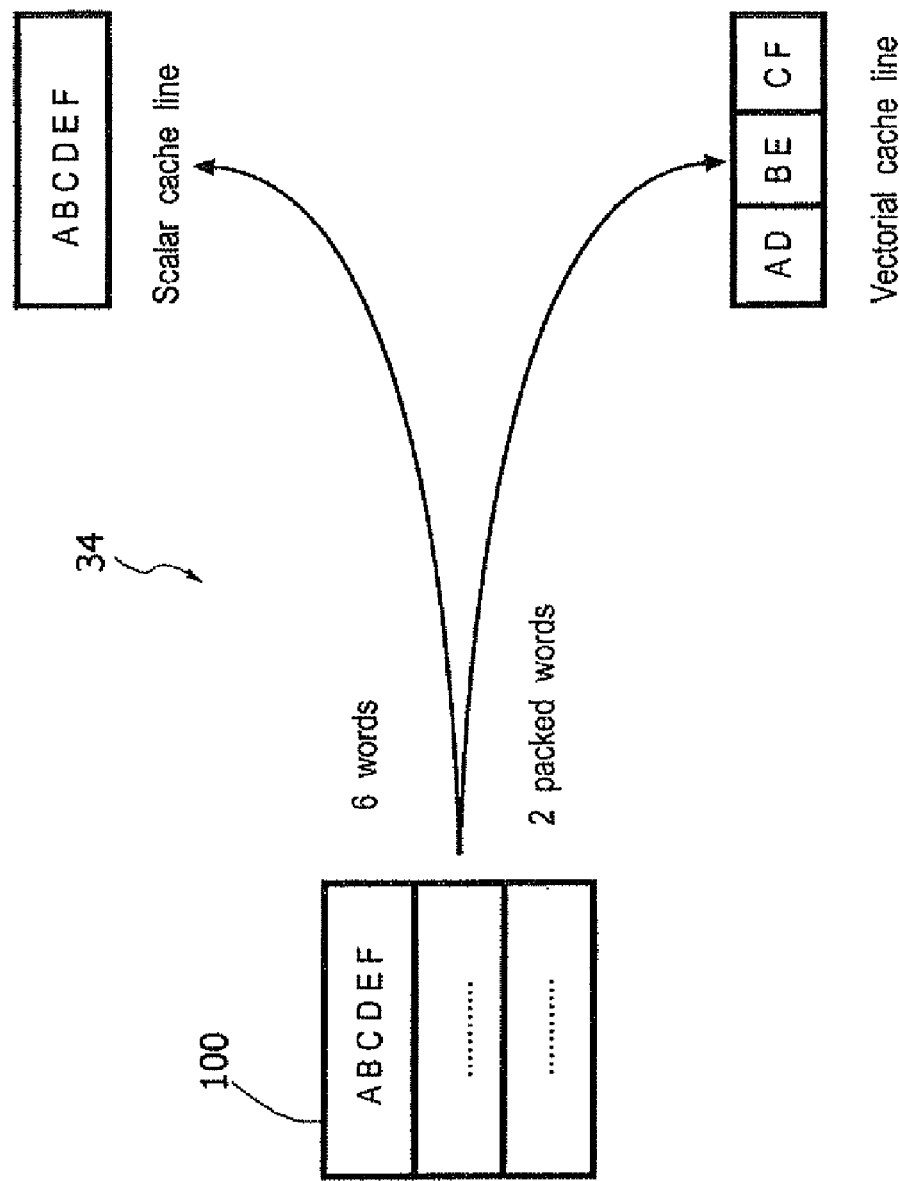
FIGS. 3 to 5 are functional block diagrams representative of a general concept of a cache access applied to the processor architecture according to the invention.
Figure 4:
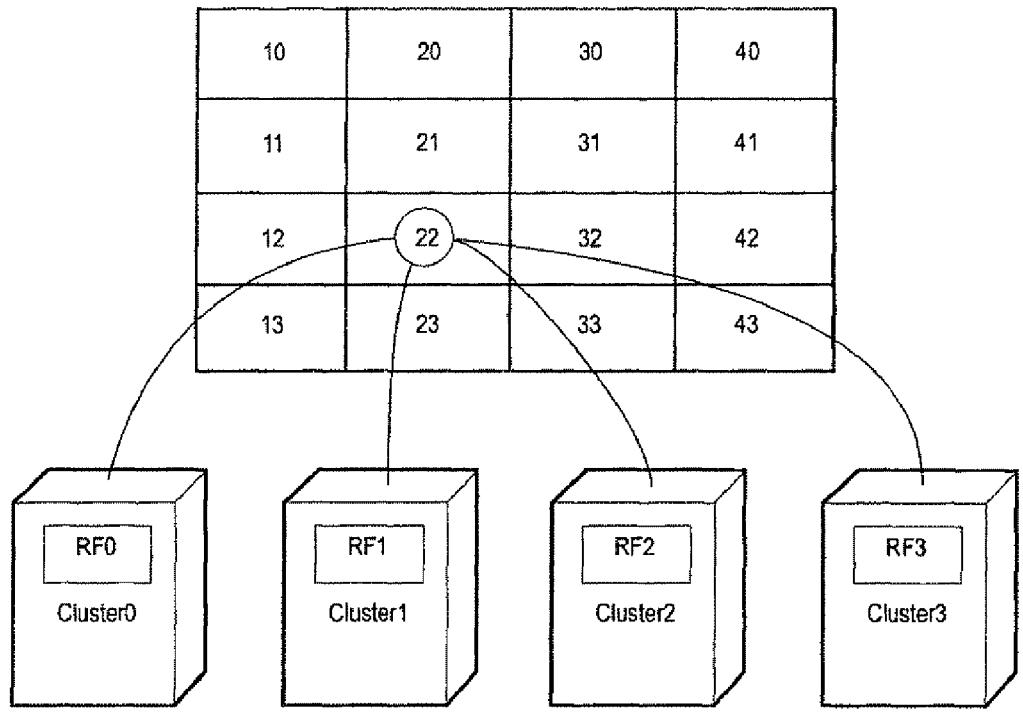
Figure 5:
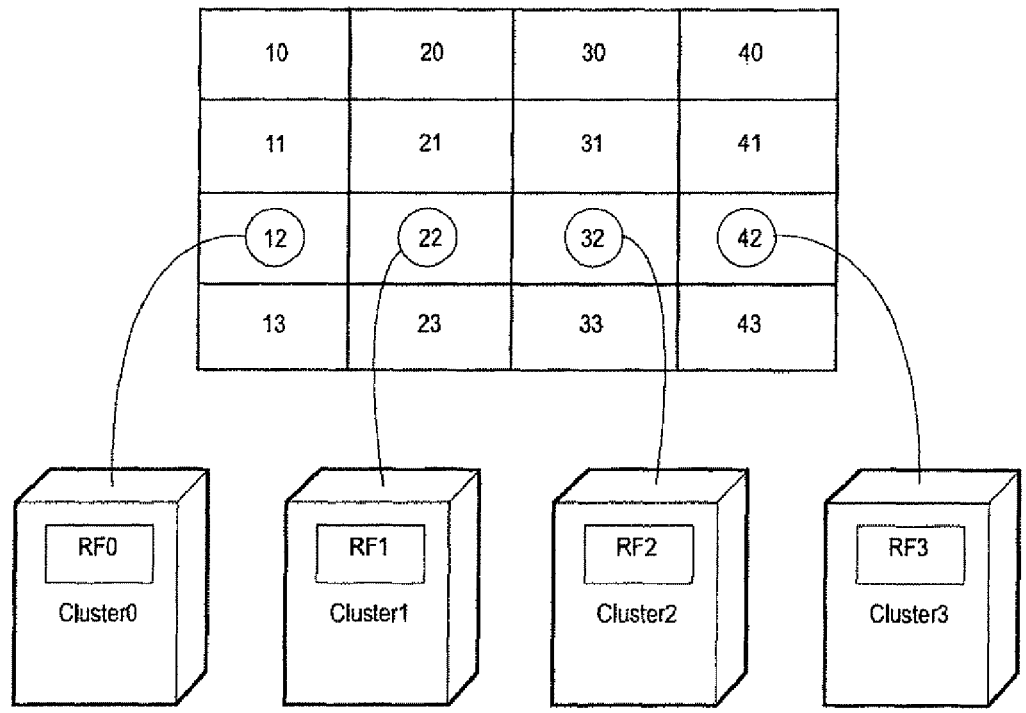

As discussed above and as further detailed in the following, the cache memory management technique described herein in connection with FIGS. 3 to 5 is applicable to a generic vectorial machine. Consequently, the scope of the invention is in no way to be construed, even indirectly, as limited to the exemplary architecture described in the following, is the subject matter of a parallel European application filed on the same day by the same applicant.

In order to further highlight the general nature of the invention, the description provided in connection with FIGS. 4 and 5 will refer to a vectorial machine including four clusters as an example of applying the cache memory management approach to any plurality of clusters. Those of skill in the art will easily understand how such a generic description can be "scaled-down" to serve two clusters as is the case of the purely exemplary architecture described herein.

By way of introduction for a detailed description of such an exemplary architecture, certain basic concepts of the processor architecture will be summarized below. This summary is made with reference to the following: "Computer Architecture: A Quantitative Approach, Third Edition", John L. Hennessy, David A. Patterson. Specifically, Section 3.6 provides a definition of the concept of VLIW, while Sections 6.1 and 6.16 provide definitions of the SIMD paradigm. Appendix G provides reference information on Vector Processors.

VLIW: Very Long Instruction Word. The purpose of a multiple-issue processors is to allow multiple instructions to issue in a clock cycle. Multiple-issue processors come in two basic types: superscalar processors and VLIW (Very Long Instruction Word) processors. Superscalar processors issue variable numbers of instructions per clock cycle, and are either statically scheduled or dynamically scheduled. Statically scheduled processors use in-order execution, while dynamically scheduled processors use out-of-order execution. VLIW processors issue a fixed number of instructions per clock cycle that are formatted either as one large instruction or as a fixed instruction packet with the parallelism among instructions explicitly indicated by the instruction. VLIW processors are inherently statically scheduled by the compiler.

SIMD: Single Instruction Multiple Data. In a SIMD arrangement the same instruction is executed by multiple processors using different data streams. Each processor has its own data memory (hence multiple data), but there is a single instruction memory and control processor, which fetches and dispatches instructions. SIMD arrangements work best in dealing with arrays in for-loops. Hence, in order to exploit massive parallelism in SIND architectures, massive amounts of data, or data parallelism, needs to be present. SIMD architectures are at their weakest point in case statements where each execution unit needs to perform a different operation on its data, depending on what data are available. Those execution units with the wrong data are disabled so that the proper units can continue. Such situations essentially run at 1/n performance level, where n is the number of cases.

Vector processors. Vector processors adopt an alternative approach to control multiple functional units with deep pipelines. Vector processors provide high-level operations that act on vectors (linear arrays of numbers). A typical vector operation might add two 64-element, floating-point vectors to obtain a single 64-element vector result. The vector instruction is equivalent to an entire loop, with each iteration computing one of the 64 elements of the result, updating the indexes, and branching back to the beginning. By using a vector instruction, the compiler or programmer indicates that the computation of each result in the vector is independent of the computation of other results in the same vector. Consequently, the hardware does not have to check for data hazards within a vector instruction. The elements in the vector can be computed using an array of parallel functional units, or a single, deeply pipelined functional unit, or any intermediate configuration of parallel and pipelined functional units.

Turning now specifically to the description of a preferred, exemplary embodiment of the invention, the arrangement described herein is a microprocessor architecture adapted to implement a high-performance, low-power device suitable for multimedia applications (wireless, image processing, video stream, etc.). The arrangement described herein is based on the concept of extending the instruction parallelism of a basic Very Long Instruction Word (VLIW) architecture with the data parallel processing of the Single Instruction Multiple Data (SIMD) paradigm.

Two significant features of the arrangement described herein as follows: the vectorial functionality integrated in the core (i.e., without providing any specific unit which is able to perform the same instruction on a large amount of data, like current Vector Processor use to do); and data path scalability which allows supporting various architectural approaches in the same machine, according to the application algorithms and/or to the different data type sections in the same algorithm.

The arrangement described herein adopts a simple architectural approach to merge data processing tasks with different sizes or widths ($2^{\wedge k}$ bits with k=0, 1, 2, 3, . . . , p). All these different data types can be processed separately or jointly, while the core operates as a vectorial machine.

Figure 1:
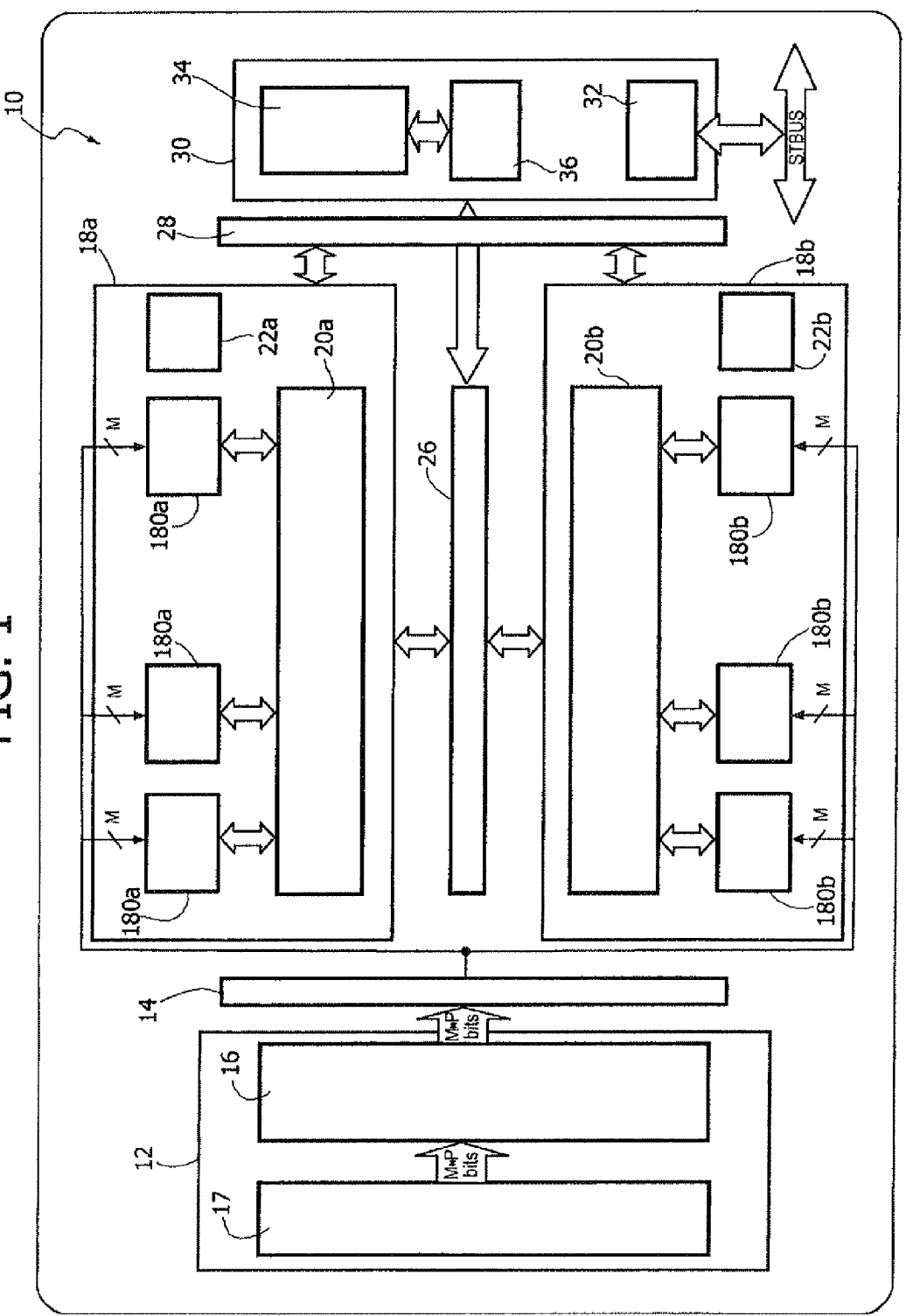
FIGS. 1 and 2 are block diagrams representative of the processor architecture including the cache memory management arrangement according to the invention.
Figure 2:
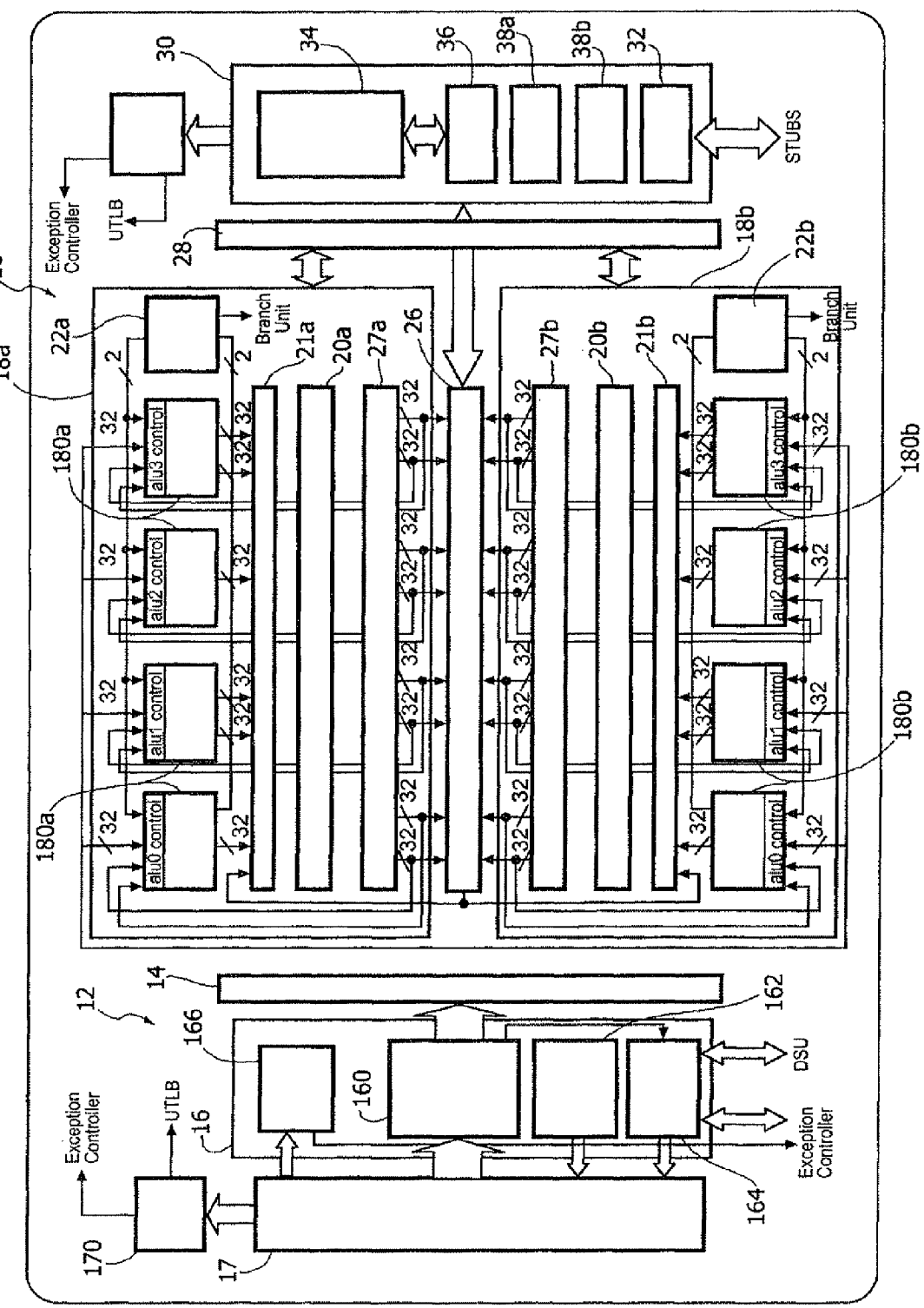

FIGS. 1 and 2 are block diagrams of an exemplary microprocessor architecture 10. Hereinafter, M and N will indicate the number of bits in each instruction and each data, respectively, as processed in the architecture 10. Similarly, P will indicate the number of Processing Elements (ALUs) and/or the number of ILPs (instructions packed in the same long instruction).

More in detail, the architecture 10 includes an I-Side (i.e., Instruction Side) Memory Subsystem 12 which represents the VLIW instruction parallelism capability, and P instructions are fetched (ideally) and decoded each clock cycle.

Reference numeral 14 denotes a Decoder Unit that, as a single decoding unit, is able to recognize the P instructions fetched via an Instruction Buffer/Fetch Unit 16. The instructions are issued towards common Processing Elements (ALUs) 180$a$, 180$b$ arranged in two clusters, namely a high cluster (ALUs 18$a$) and a low cluster (ALUs 18$b$).

As better shown in FIG. 2, the I-Side Memory Subsystem also includes an instruction cache (ICache) 17 interfacing with an ITLB module 170. The Instruction Buffer/Fetch Unit 16 includes an Instruction Buffer/Fetch Block proper, indicated as 160, having associated an Icache control unit 162 and a PC and Branch Unit 164 (for ensuring DSU and Exception controller functionalities) as well as an IPU 166.

The plural clusters, typically to the number of two, i.e., 18$a$, 18$b$, lie at the basis of the vectorial functionality of the architecture 10. The computational units of the processor are in fact represented by the two clusters 18$a$, 18$b$ (High and Low) each of which includes P Processing Elements (ALUs) 180$a$ (cluster high 18$a$) and 180$b$ (cluster low 18$b$) that integrate various computational resources, e.g., adders, multipliers, shifters as well as fully customized, and hardware dedicated units.

Each Processing Element (PE) in either cluster 18$a$, 18$b$ has the same range of computational resources of a symmetrical PE in the other cluster. This type of resource distribution guarantees or insures a proper vectorial capability as described above. Each PE is able to operate with N bit data and/or in a SIMD way: this means that the architecture 10 is capable of operating both as a scalar microprocessor (with N bit data width) as well as with two N/2 bit data or four N/4 bit data and so on (data with bit lengths obtained by partitioning the bit length N according to a Single Instruction Multiple Data paradigm) as long as this approach is meaningful, according to the application data types.

Each cluster 18a, 18b has an associated general purpose register file 20a, 20b (with respective write-port multiplexers 21a and 21b, shown in FIG. 2 only), bypass elements 27a, 27b (again shown in FIG. 2 only) and an associated branch register file 22a, 22b. Each branch register file is configured to support the SIMD capability, as better detailed in the following.

Hereinafter, the distinction of the two clusters 18a, 18b as high and low will refer to the use in association with the N high (i.e. more significant) bits and the N low (i.e., less significant bits) of 2*N bits operands loaded into the clusters 18a, 18b by a Load/Store Unit 26.

An Intercluster Data Path 28 allows exchanging and/or merging data between the two clusters 18a, 18b. The Intercluster Data Path 28 is capable of performing pure 2*N bit data operations, as better detailed in the following. The Intercluster Data Path 28 has the main purpose of enabling the architecture 10 to use and mix, at the same time, information contained in adjacent data (like the pixels in an image, for example) as typically required in multimedia applications.

The D-Side (i.e., Data Side) Memory Subsystem 30 and the Load/Store Unit 26 manage data fetching, data storage and communication with the external memory through a core memory controller 32 interfacing with an external bus (e.g., STBUS). Within the D-Side Memory Subsystem 30 Reference numerals 34 and 36 indicate a Data Cache (DOCache) and the associated DCache control unit, respectively. Finally, references 38a and 38b designate a prefetch buffer and a write buffer, respectively.

The machine/architecture 10 illustrated herein is able to run the same instruction separately and simultaneously (in a parallel way) on each cluster 18a, 18b on the lower and higher part of the 2*N bit data. This approach allows Vector instructions to be executed on the two N-bit data. The data path scalability allows support for the following types of functionality.

N bit Scalar functionality. By activating only the low cluster 18b, the architecture can operate in a standard N bit data mode in order to preserve the VLIW original functionality. This is useful for exploiting primarily the Instruction Level Parallelism.

N bit Vectorial functionality. By activating both clusters 18a, 18b (Vectorial machine), the same standard (scalar) N bit instructions can be performed in a parallel mode on different N data bits. This type of functionality can be defined N bit SIMD data. Significantly, the VLIW capability (M*P instructions at each clock cycle) linked with an N bit Vectorial functionality is essentially equivalent to the Vector processor reported in the literature. As explained in the introductory portion of this detailed description, if the computation of each result in the data vector (i.e., the vector whose elements of N bits are stored in the General Purpose Register Files 20a, 20b), is independent of the computation of other results in the same data vector, the elements in the data vector can be computed using the array of parallel Processing Elements.

Should the need arise, the scalability extension of the number of the Processing Elements in the clusters 18a, 18b allows packing of P times the same instruction that processes a very large number of N bit data. This is in contrast to a conventional vector processor, which would require storing and processing at least a part of these data in a separate part of the machine. Here the integration of the Vectorial side is actually effected in the Scalar core.

N/k (k=2, 4, 8 . . . ) bit SIMD functionality. By activating only the low cluster 18b, N/2 bit, N/4 bit (and so on) data SIMD instructions can be performed. This data path approach essentially represents a typical SIMD machine. Obviously, the Processing Elements in the cluster 18b must be supported (i.e., logically configured) to operate as N/k (k=2, 4, 8 . . . ) bit data as well as N bits data. The information to select one of these operational modes is in the instruction itself (e.g., as a dedicated field of instruction bits).

Vectorial SIMD machine. This corresponds to activating both clusters 18a, 18b to perform N/k (k=2, 4, 8 . . . ) data SIMD instructions. This functionality can also be regarded as 2*N bit SIMD data. It is an extension of an operative functionality that allows exploiting more extensively the data parallelism when the application algorithm can be organized with packed data that are a fraction of N.

As mentioned previously, data can be exchanged between the two clusters 18a, 18b through the Intercluster Data Path 28, which is also configured in order to be able to perform operations on the data. This will permit extending of the Instruction Set Architecture with pure 2*N bit operations. The operands for these operations are derived from the Register Files 20a, 20b in the two clusters 18a, 18b, thus making it unnecessary for the module 28 between the clusters 18a, 18b to have a respective register file available for its own.

The architecture 10 just described allows each vectorial element to operate on packed data as a SIMD processor. However, when using only the low cluster 18b, when the application does not require vectorial data processing, it is possible to disable the high cluster 18a, thus reducing power consumption. This kind of cluster power management can be controlled via a single bit included in the instructions itself.

The degree of instruction parallelism obtained with the VLIW approach, in conjunction with the data path approaches discussed in the foregoing, contributes to another significant feature of the architecture 10 described herein, namely the possibility to provide—in the same bundle of multiple instructions and at the same time: N bit scalar operation; N bit SIMD operation; N/k (k=2, 4, 8 . . . ) bit SIND operation (on a single cluster); and 2*N bit SIMD operation processed separately on the two clusters or jointly via ad hoc instructions in the Intercluster Data Path module 28.

The goal of performing within the same bundle multiple instructions on different data sizes is achieved by rendering pipe management functions mutually independent.

The architecture 10 will recognize a functionality as Vectorial and SIMD directly from the instruction opcode. This permits a natural extension of the instruction set reserving two bits for these purposes. For instance, a practical nonlimiting example can be considered where:

M=32: this is a typical instruction opcode size;
N=32: the machine operates on 32 bit data (the load/store unit 26 will fetch 64-bit data from the memory 34);
P=4: four ALUs are used as the Processing Elements and represent the computational resources of the core; as a consequence the VLIW ILP is of four instructions that are fetched and executed each pipe cycle.

The possible data path approaches are:
32 bit Scalar functionality, activation of the low cluster 18b;

32 bit vectorial functionality, both clusters 18a, 18b are activated (vectorial machine);

16 and/or 8 bit SIMD functionality: only the low cluster 18b is activated to perform 16-bit and/or 8-bit data SIMD instructions (if the ALUs are able to operating both with 16-bit and 8 bit operands);

vectorial SIMD machine: both clusters 18a, 18b are activated to perform 16-bit and/or 8-bit data SIMD instructions; this represents a 64 bit SIMD operative solution on two separated group of 2*16 or 4*8 bits of data; and the intercluster data path 28 exchanges data between the two clusters 18a, 18b with the possibility of extending the Instruction Set Architecture with pure 64 bits operations.

The architecture just described relies on its intrinsic Data Path Scalability, a simple approach that provides a very high degree of flexibility that makes it possible to handle simultaneously different data types and, possibly, to execute more complex 2*N bit operations (64-bit operations, in the practical example) through the intercluster data path.

The architecture 10 can thus very easily adapt to different kinds of applications in the multimedia field. This is due to the hybrid nature of the architecture, which provides a high performance level with just a very limited increase in terms of occupied area. A basic advantage is related to the possibility of change at runtime, instruction by instruction, the bit size of the computational units with the possibility of operating on data with different bit lengths in the same clock cycle. This permits a full support of Data Path Scalability with the proper resources.

Those of skill in the art will appreciate that the notional weakness of separate N-bit processing translates into an increased strength in terms of system availability and extensibility. Each of the clusters 18a, 18b includes independent processing elements (PEs) 180a, 180b, and the possibility of connecting clusters via a local data path, makes it much easier to replace a certain processing element with another (held to be more suitable for meeting the design requirements) without modifying the internal connection logic as required in a conventional multiprocessor system.

This kind of pseudo-isolation of the two clusters 18a, 18b also renders the machine easier to expand without having to bring down the application that runs on it. High availability and fast, incremental extensibility are key features of the architecture just described in many IC fields.

Another interesting feature of the architecture just described is instruction extensibility. The architecture 10 can execute both SIMD and MIMD instructions by becoming easily available and adaptable to various algorithms, or various sections of the same algorithm, that require different degrees of Instruction Level Parallelism or Data Level Parallelism for high speed performance.

Power control is primarily managed at the instruction schedule level. A good compiler and a judicious algorithm code writing can take advantage of multiple and mixed machine capability to make the schedule of the instructions and their packing in the bundle a proper basis for low power consumption. For instance the instruction can selectively activate or and de-activate the high cluster 18a when operation does not require the computational resources associated therewith. Power control can be advantageously performed at the level of processing element (PEs) when any of them are not used, e.g., as the compiler has not found P independent operations.

The approach adopted for optimizing cache accesses will now be described. As already indicated, the cache memory management technique described herein in connection with FIGS. 3 to 5 is applicable to any generic vectorial machine. Consequently, the scope of the invention is in no way to be construed, even indirectly, as limited to the exemplary architecture described below. In fact, the description provided in connection with FIGS. 4 and 5 will refer to a vectorial machine including four clusters (Cluster 0, . . . , Cluster 3) as an example of applying that cache memory management approach to any plurality of clusters.

The related access mechanism is based on using a single cache (such as the Data cache 34 of FIGS. 1 and 2) that is accessed by using both a global-type access mechanism and a local-type access mechanism. In other words, the cache is considered both as a single cache (SM) or as a cache comprised of a plurality of smaller caches (M). The choice between the two approaches is not made in a static manner, but run-time, and can vary from one line of cache to another.

This result is achieved with the introduction of control registers that explicitly map those data locations of the (cache) memory to be considered as scalar and those data locations to be considered as vectorial.

When transferring data between an external memory 100 (FIG. 3) and the cache (the cache 34 will be considered here as an example), if the location (e.g. a line) to which data is being transferred is in the scalar address space then the data is copied, as it is, in the cache line and the data contained therein are considered as a set of K words of dimension w. Conversely, in the vectorial case, these data are considered as a set of K/L words of dimension L*w containing the data to be sent to the L clusters (obviously L=2, in the example of FIGS. 1 and 2). In fact each cache line is regarded, under all respects, as subdivided into L lines of dimension K/L (the data of dimension L*w is then subdivided into L data of dimension w, by ensuring the correct routing towards the relative cluster).

This approach is represented in FIG. 3. The right portion thereof shows a scalar cache line and a vectorial cache line, respectively. In that way, the same cache memory can be regarded as a cache memory wherein each line includes K*L words having a dimension w in the scalar case or K words having a dimension L*w in the vectorial case, by ensuring in both instances an optimum exploitation of the cache memory.

When reading a data item present in the cache memory, the information as to the type of data to read (as derived from the control registers) is read as a first step. If the address to be accessed is marked as scalar, the single data item is accessed by making it available simultaneously to all clusters (FIG. 4).

If conversely, access is regarded as vectorial, a data dimension is considered equal to L times the scalar data item, where L is the number of clusters that are active, and the data are copied as shown in FIG. 5, i.e., as L data items respectively distributed to the L processor clusters that are active.

If access is scalar, the address is computed based on its own data by the cluster that needs the data. In the case of vectorial access, the address is computed only by one of the processors and is identical for all of them.

An evident advantage of the mechanism just described lies in the possibility of managing both parallel and scalar parts in an algorithm, while always fully exploiting the cache memory (even if just one of the processors is operating, this has the full availability of the entire cache memory).

Moreover, the capability of establishing and modifying run-time on portions of the memory are to be considered vectorial and on portions of the memory are that are to be considered scalar, together with the possibility for each cluster to access the memory in a scalar way, makes it possible to perform in a simple and rapid manner initialization and data exchange operations between the clusters.

This feature renders the cache controller even more versatile and adapted to operate with a vectorial architecture having a number of clusters higher than two. If required, the cache can play the role of the intercluster data path when this is not present or in those arrangements where introducing a high number of inter-cluster connections would be excessively cumbersome.

Additionally, the possibility exists of accessing directly in a scalar mode a data item present in the cache memory and forwarding it to all the clusters currently active without having plural copies of the same data (e.g., constants) as it would happen in the case of distributed cache memories.

The example just described refers to a direct-mapped cache for the sake of simplicity, but the proposed approaches can be applied without limitations irrespective of the policy adopted for cache management.

An architecture as portrayed in FIG. 2 has been implemented with the following characteristics:

Clock frequency: 400 MHz ->600 MHz

Data parallelism: average 2.5× (peak of 4× the ST231 performances inside inner loops 16 bit based)

Power: 200 mW @400 MHz. Max power dissipation: 0.25-0.30 mW/MHz (estimation in 90 nm).

Area: <2 mm² with 32+32 KB I/D$ caches.

Without prejudice to the underlying principles of the invention, the details and the embodiments may vary, even appreciably, with reference to what has been described by way of example only, without departing from the scope of the invention as defined by the annexed claims.

That which is claimed:

1. A method for managing a data cache memory associated with a processor comprising a plurality of processor clusters that operate simultaneously on scalar and vectorial data, the plurality of processor clusters comprising a low cluster and a high cluster coupled to the data cache memory via an intercluster data path, with the low cluster being selectably activated to only operate on the scalar data and with both the low and high clusters being selectably activated to operate on the vectorial data, the method comprising:
   providing in the data cache memory data locations for storing therein data for processing by the plurality of processor clusters; and
   accessing the data locations in the data cache memory via the intercluster data path either in a scalar mode or in a vectorial mode, each processor cluster comprising a plurality of processing elements, with the plurality of processing elements in each processor cluster being symmetrical with the plurality of processing elements in other processor clusters so that activating the low cluster only supports the scalar mode and activating both the the low cluster along with the high cluster supports the vectorial mode, with the accessing based on the following
      if accessing the data locations is in the scalar mode, then an address to be accessed is computed by the processor cluster that needs the data, and
      if accessing the data locations is in the vectorial mode, then the address to be accessed is computed by one of the processor clusters and is identical for all of them.

2. The method of claim 1, further comprising explicitly mapping the data locations of the cache memory that are scalar and the data locations of the cache memory that are vectorial.

3. The method of claim 1, wherein transferring data into the cache memory comprises:
   if transfer is in the scalar mode, then the data is considered as a set of K words of dimension w; and
   if transfer is in the vectorial mode, then the data is considered as a set of K/L words of dimension L*w, whereby each data location in the cache memory is subdivided into L locations of dimension K/L.

4. The method of claim 1, further comprising reading data for processing by accessing the data locations in the cache memory, wherein:
   if access is in the scalar mode, then the data item accessed is made available simultaneously to all of the processor clusters; and
   if access is in the vectorial mode, and an n number of processor clusters are active, then the data item accessed has a dimension equal to n times the dimension of a scalar data item, and the data is distributed as n respective data items to the n processor clusters that are active.

5. A processor comprising:
   a data cache memory for storing data for processing, with data locations therein being accessible either in a scalar mode or in a vectorial mode;
   an intercluster data path coupled to said data cache memory; and
   a plurality of processor clusters comprising a low cluster and a high cluster coupled to said intercluster data path and being selectably activated to operate on scalar and vectorial data, and for accessing the data locations via the intercluster data path either in the scalar mode or in the vectorial mode, each processor cluster comprising a plurality of processing elements, with the plurality of processing elements in each processor cluster being symmetrical with the plurality of processing elements in other processor clusters so that activating the low cluster only supports the scalar mode and activating both the low cluster along with the high cluster supports the vectorial mode, with the accessing based on the following
      if accessing the data locations is in the scalar mode, then an address to be accessed is computed based on its own data by the processor cluster that needs the data, and
      if accessing the data locations is in the vectorial mode, then the address to be accessed is computed only by one of the processor clusters and is identical for all of them.

6. The processor of claim 5, further comprising at least one control register for explicitly mapping the data locations in said data cache memory that are scalar and the data locations that are vectorial.

7. The processor of claim 5, wherein said plurality of processor clusters is configured so that transferring data into said cache memory comprises:
   if transfer is in the scalar mode, then the data is considered as a set of K words of dimension w; and
   if transfer is in the vectorial mode, then the data is considered as a set of K/L words of dimension L*w, whereby each location in the cache memory is subdivided into L locations of dimension K/L.

8. The processor of claim 5, wherein said plurality of processor clusters is configured so that reading data for processing by accessing the data locations in the cache memory is based on the following:
   if access is in the scalar mode, then the data item accessed is made available simultaneously to all of said processor clusters; and
   if access is in the vectorial mode, and an n number of processor clusters are active, then the data item accessed has a dimension equal to n times the dimension of a scalar data item, and the data is distributed as n respective data items to the n processor clusters that are active.

9. A data cache memory associated with a processor comprising a plurality of processor clusters comprising a low cluster and a high cluster and being selectably activated to operate on scalar and vectorial data, the plurality of processor clusters being coupled to the data cache memory via an intercluster data path, the data cache memory comprising:

data locations for storing data for processing by the plurality of processor clusters, with the data locations being accessible via the intercluster data path either in a scalar mode or in a vectorial mode, each processor cluster comprising a plurality of processing elements, with the plurality of processing elements in each processor cluster being symmetrical with the plurality of processing elements in other processor clusters so that activating the low cluster only supports the scalar mode and activating both the low cluster along with the high cluster supports the vectorial mode, with the accessing based on the following if accessing the data locations is in the scalar mode, then an address to be accessed is computed based on its own data by the processor cluster that needs the data, and if accessing the data locations is in the vectorial mode, then the address to be accessed is computed only by one of the processor clusters and is identical for all of them.

10. The data cache memory of claim 9, further comprising at least one control register for explicitly mapping the data locations that are scalar and the data locations that are vectorial.

11. The data cache memory of claim 9, wherein the plurality of processor clusters is configured so that transferring data into the data locations comprises:

if transfer is in the scalar mode, then the data is considered as a set of K words of dimension w; and if transfer is in the vectorial mode, then the data is considered as a set of K/L words of dimension L*w, whereby each location in the cache memory is subdivided into L locations of dimension K/L.

12. The data cache memory of claim 9, wherein the plurality of processor clusters is configured so that reading data for processing by accessing the data locations is based on the following:

if access is in the scalar mode, then the data item accessed is made available simultaneously to all of the processor clusters; and if access is in the vectorial mode, and an n number of processor clusters are active, then the data item accessed has a dimension equal to n times the dimension of a scalar data item, and the data is distributed as n respective data items to the n processor clusters that are active.

* * * * *

UNITED STATES PATENT AND TRADEMARK OFFICE
CERTIFICATE OF CORRECTION

PATENT NO. : 8,078,804 B2
APPLICATION NO. : 11/768462
DATED : December 13, 2011
INVENTOR(S) : Pappalardo et al.

It is certified that error appears in the above-identified patent and that said Letters Patent is hereby corrected as shown below:

| | |
|---|---|
| Column 1, Line 35 | Delete: "PC"<br>Insert: --PCI-- |
| Column 2, Line 43 | Delete: "comprising"<br>Insert: --comprise-- |
| Column 2, Line 49 | Delete: "mode,"<br>Insert: --mode.-- |
| Column 3, Line 51 | Delete: "SIND"<br>Insert: --SIMD-- |
| Column 4, Line 23 | Delete: "use"<br>Insert: --used-- |
| Column 5, Line 36 | Delete: "DOCache"<br>Insert: --DCache-- |
| Column 6, Line 46 | Delete: "SIND"<br>Insert: --SIMD-- |
| Column 7, Line 5 | Delete: "operating"<br>Insert: --operate-- |
| Column 7, Line 59 | Delete: "and" |
| Column 8, Line 15 | Delete: "(M)"<br>Insert: --(DM)-- |

Signed and Sealed this
Twenty-eighth Day of February, 2012

David J. Kappos
*Director of the United States Patent and Trademark Office*

CERTIFICATE OF CORRECTION (continued)
U.S. Pat. No. 8,078,804 B2

Column 8, Line 63     Delete: "are"

Column 9, Line 50     Delete: "the"